United States Patent
Barnes

[11] 3,777,838
[45] Dec. 11, 1973

[54] REAR SUSPENSION SYSTEM FOR A MOTOR VEHICLE

[75] Inventor: John V. Barnes, Plymouth, Mich.

[73] Assignee: Ford Motor Company, Dearborn, Mich.

[22] Filed: Mar. 24, 1972

[21] Appl. No.: 237,821

[52] U.S. Cl. .................................. 180/71, 267/66
[51] Int. Cl. ............................................. B60g 9/00
[58] Field of Search ........................ 180/71, 73 R; 267/20 C, 20 R, 20 A; 280/124 R

[56] References Cited
UNITED STATES PATENTS
| | | | |
|---|---|---|---|
| 3,177,006 | 4/1965 | Knight | 267/66 |
| 3,422,918 | 1/1969 | Musser, Jr. et al. | 180/73 |
| 3,333,866 | 8/1967 | Cuskie | 280/124 |

FOREIGN PATENTS OR APPLICATIONS
1,190,162  4/1970  Great Britain ........................ 180/71

Primary Examiner—Kenneth H. Betts
Assistant Examiner—Jack D. Rubenstein
Attorney—Keith L. Zerschling et al.

[57] ABSTRACT

A suspension system for the driving wheels of a motor vehicle that are interconnected by a rigid axle housing. In the preferred embodiment, the axle housing is positioned with respect to the vehicle's chassis frame solely by a pair of arms. Each arm is connected to the vehicle frame by a single pivot. A pair of pivots that are both vertically and horizontally spaced apart connect each arm to the axle housing.

1 Claim, 6 Drawing Figures

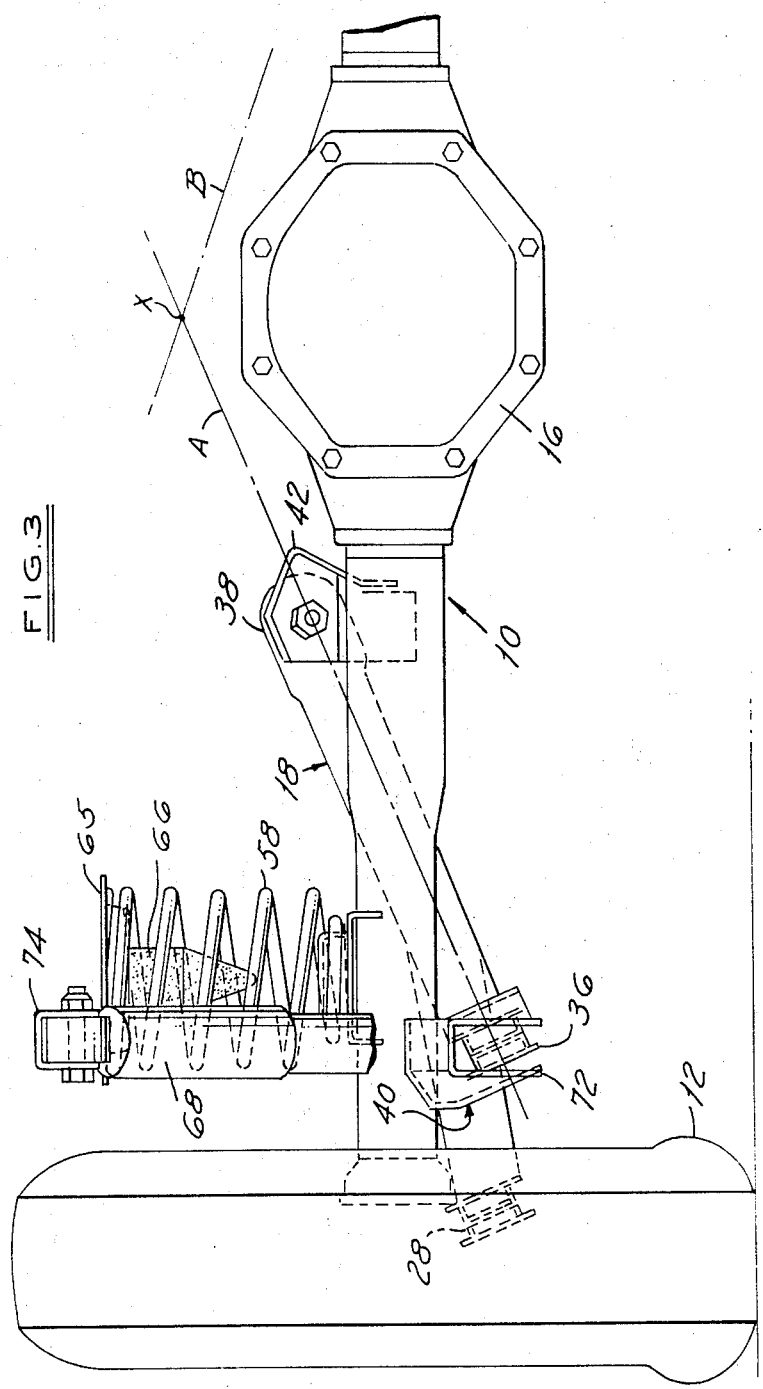

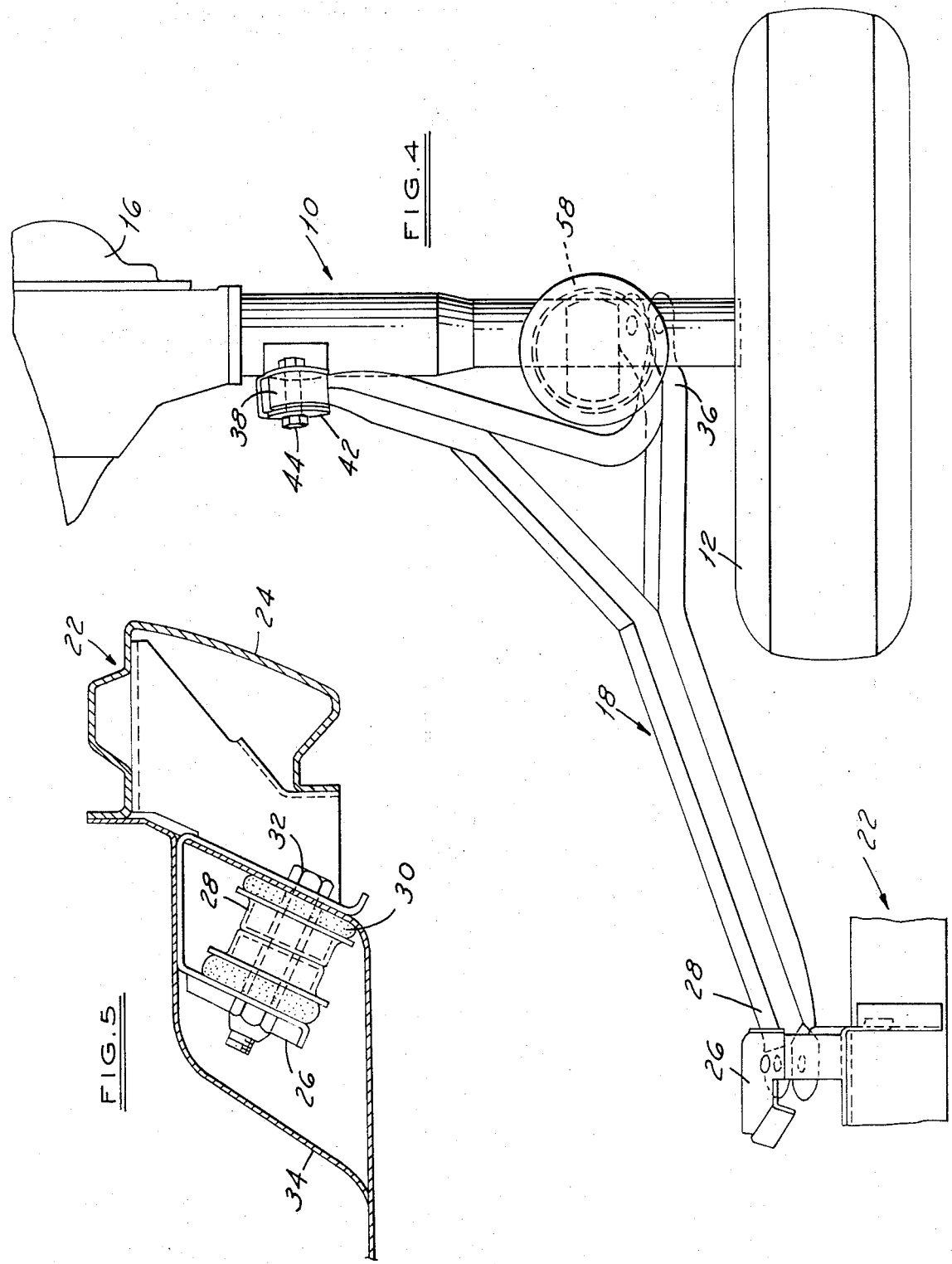

REAR SUSPENSION SYSTEM FOR A MOTOR VEHICLE

BACKGROUND OF THE INVENTION

The present invention relates generally to motor vehicle suspension systems, and more particularly to a rear suspension system for a solid axle having a pair of driving wheels.

It is the principal object of any vehicle suspension system to provide an articulated connection between the vehicle's wheels and chassis so that the wheel may traverse a jounce and rebound path when the vehicle is driven over an irregular surface. A suspension also includes a spring device for resiliently supporting the chassis upon the wheels. In addition to permitting jounce and rebound movement of the wheels, a good suspension system will control the path of the wheels so that certain operating advantages may be realized. for an example, the suspension can control the tendency of the body to lean when the vehicle is cornering and it can also control the tendency of the rear end to lift on braking or squat on acceleration. Further, a suspension system for the rear driving wheels of a motor vehicle must stabilize the axle against braking and accelration torque.

BRIEF SUMMARY OF THE INVENTION

In accordance with the present invention, a suspension system is provided for the rear driving wheels of a motor vehicle having a rigid interconnecting axle housing. The suspension is particularly characterized by its marked simplicity of design while achieving the suspension geometry advantages of more sophisticated systems.

In particular, in accordance with the present preferred embodiment of this invention, a suspension system is provided having only two suspension arms to define the jounce and rebound path of the axle housing and to carry braking and acceleration torque. The two arms are symmetrically arranged with respect to the centerline of the vehicle. Each arm has a single pivot connecting it to the chassis frame and a pair of pivots connecting it to the axle housing. The axle housing pivots for each arm are spaced apart in both the side elevational and plan views.

BRIEF DESCRIPTION OF THE DRAWINGS

The many objects and advantages of a suspension constructed in accordance with the present invention will be more fully comprehended from the following discussion and the accompanying drawings, in which:

FIG. 3 is a rear elevational view of the left half ot the suspension system;

FIG. 4 is a top plan view of the left half of the suspension;

FIG. 5 is a front elevational view, partly in section, showing the pivotal attachment of the left suspension arm to the vehicle frame.

DETAILED DESCRIPTION OF THE PREFERRED EMBODIMENT

Figure 1:
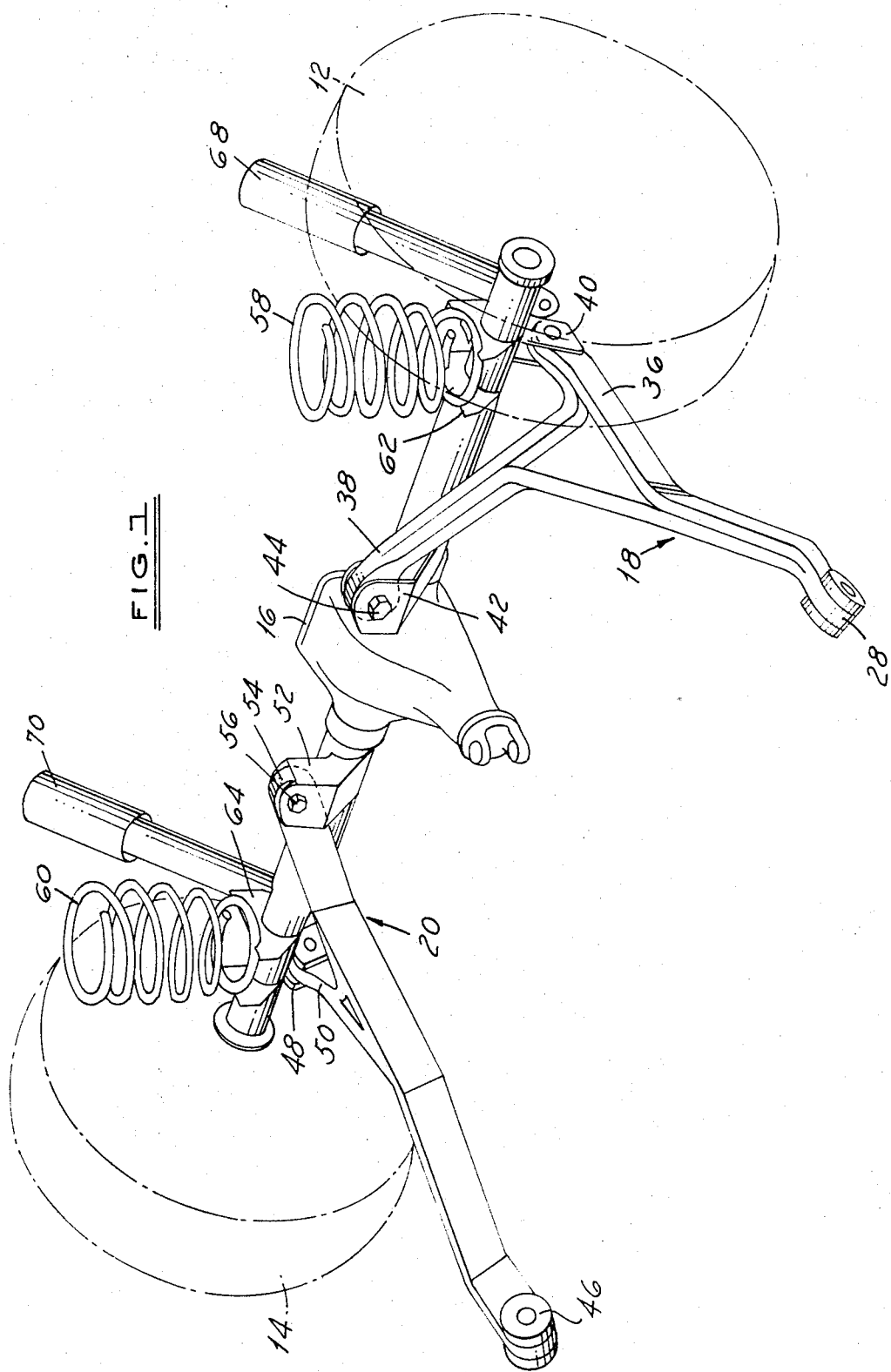
FIG. 1 is a perspective view of a motor vehicle suspension system incorporating the preferred embodiment of this invention.

Referring now to the drawings for a detailed understanding of the presently preferred embodiment of this invention, FIG. 1 illustrates a rear suspension system for a motor vehicle having a rigid axle housing 10 that interconnects left and right road wheels 12 and 14. The axle housing 10 includes differential gearing contained within the differential housing 16. The differential gearing is connected to the vehicle's power plant in a conventional fashion and distributes driving torque through the axle shafts contained within the axle housing 10 to the road wheels 14 and 12.

Symmetrically arranged left and right suspension arms 18 and 20 connect the axle housing 10 to the chassis frame 22 of the vehicle. The suspension arms 18 and 20 each have a generally triangular shape with a forward corner pivotally connected to the frame 22 and inner and outer rearward corners pivotally connected to the axle housing 10.

The chassis frame 22 includes a longitudinally extending support component or side rail 24 to which a supporting bracket 26 is welded. The left suspension arm 18 has a forward end 28 that is formed with an eye to receive a rubber bushing 30. A bolt 32 pivotally secures the bushing 30 and the forward end 28 of arm 18 to the bracket 26 (see FIG. 5).

The side rail 24 of the chassis frame 22 also supports vehicle body structure, including the sheet metal 34 (FIG. 5) that forms a part of the floor pan of the vehicle.

The triangular-shaped left suspension arm 18 has inner and outer rear corners 36 and 38 that are each provided with eyes to receive resilient pivot bushings. The left end of the axle housing 10 has a depending bracket 40 to which the outer corner 36 of the arm 18 is pivotally attached by means of a resilient bushing. The bushing is received within the eye in the arm and secured to the bracket 40 by a bolt 41. The resilient bushing connecting corner 38 of arm 18 to the bracket 40 is of a construction similar to that of bushing 30 shown in FIG. 5.

An inner bracket 42 extends upwardly and forwardly from the axle housing 10. The bracket 42 is disposed just outboard of the differential 16 and slightly forwardly of the centerline of the axle housing 10. The end of the inner corner 38 of the suspension arm 18 is provided with an eye. a resilient bushing 43 pivotally connects the arm portion 38 to the bracket 42. This bushing is also of a construction similar to that of bushing 30 in FIG. 5. It is secured to the bracket 42 by a bolt 44.

The right suspension arm 20 is similarly constructed and arranged. The forward end of the arm 20 is provided with an eye 46 for attachment to the right side rail of the chassis 22 by means of a resilient bushing and bolt.

An outboard axle bracket 48 extends downwardly from the right outer end of the axle housing 10. The right rear corner 50 of the suspension arm 20 is pivotally connected to the bracket 48 by a resilient bushing and bolt.

An upstanding flange 52 is situated just to the right of the differential housing 16 and just forwardly of the center line of the axle housing 10. Corner 54 of arm 20 is constructed with an eye and a resilient bushing is positioned within that eye. The bushing is pivotally connected to the bracket 52 by means of a bolt 56.

Figure 2:
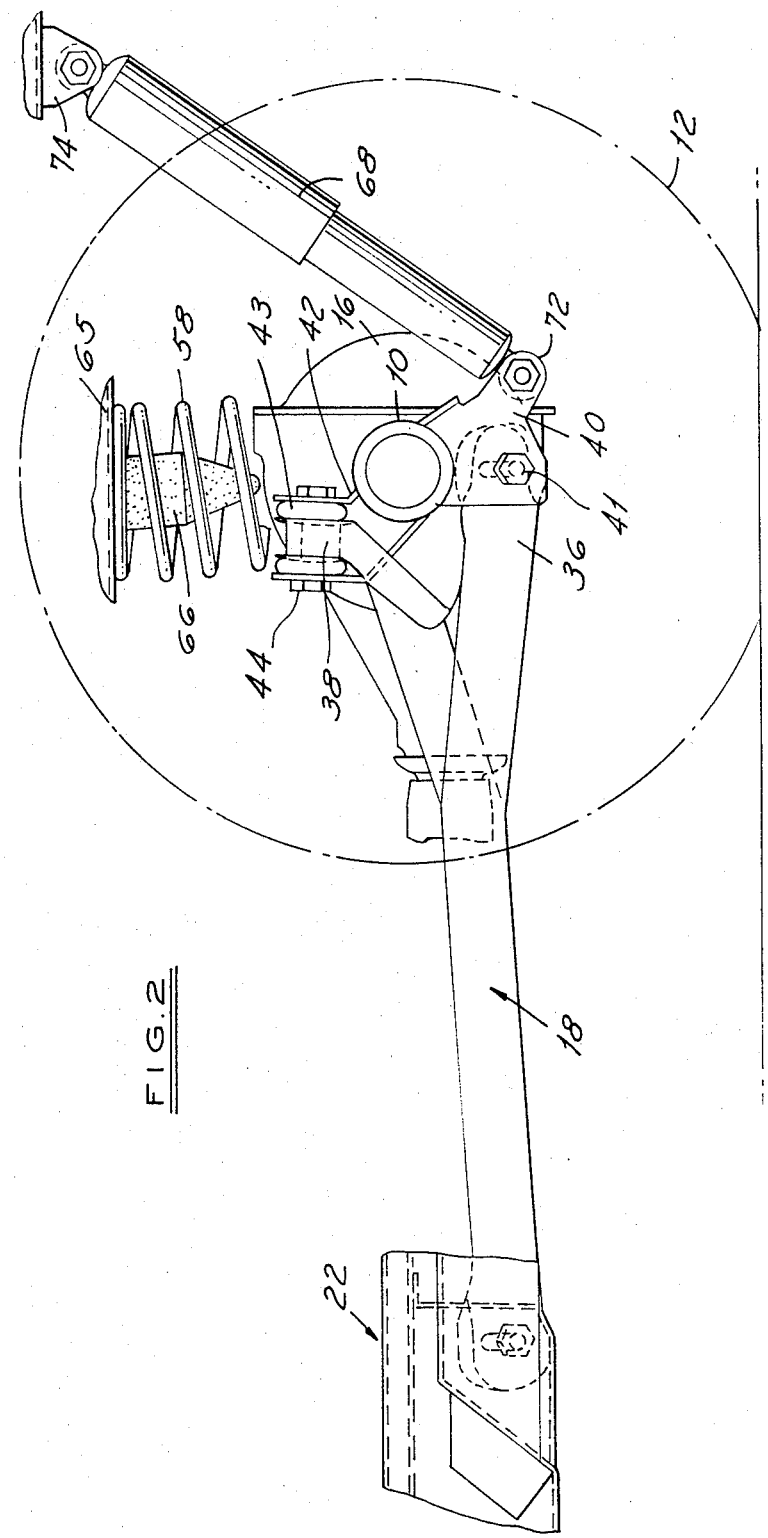
FIG. 2 is a side elevational view of the suspension system of FIG. 1.

The vehicle body and chassis frame are located relative to the axle housing 10 by the left and right suspension arms 18 and 20 and are supported on the axle housing by means of left and right coil type suspension springs 58 and 60. Left and right brackets 62 and 64 are secured to the outer ends of the axle housing 10 and form spring seats to which the coil springs 58 and 60 are attached. Spring seats such as spring seat 65 shown in FIGS. 2 and 3 are formed in the chassis structure to receive the upper ends of the coil springs 58 and 60.

A rubber bumper 66 is connected to the upper spring seat 65 and is concentrically disposed within the coil springs 58 and 60. The rubber bumper 66 will strike the lower spring seat 62 upon extreme jounce deflection and cushion the force of the impact.

Left and right telescopic shock absorbers 68 and 70 are interposed between the axle housing 10 and the vehicle's chassis frame. The bracket 40 which supports the rear outer corner 36 of the suspension arm 18 has a rearwardly extending portion 72 that provides an attachment point for the lower end of the shock absorber 68. The upper end of the shock absorber 68 is pivotally connected to a bracket 74 that is secured to the chassis. In a similar fashion, the right-hand shock absorber 70 has its lower end connected to the bracket 48 and its upper end connected to a bracket secured to the chassis frame.

The principal distinguishing feature of a suspension system constructed in accordance with this invention is its simplicity. The suspension has a lower total piece cost because there are significantly fewer parts than a conventional coil spring construction. The simplicity of design, in addition, provides a suspension having lower assembly or manufacturing costs. The structure of FIG. 1 can be constructed as a complete subassembly with a minimum number of attachment points to a vehicle chassis.

Referring to FIG. 3, imaginary line A passing through the center of the bushings which attach the arm 18 to the axle housing 10 intersects an imaginary line B passing through the attachment points for the right suspension arm 20. The lines A and B intersect at point X which is the instantaneous center of the linkage system comprising the two arms 18 and 20. The point X defines one point on the roll axis of the vehicle and the inclination of the suspension arms 18 and 20 can be adjusted or selected to provide the desired roll center height.

The spacing in the side elevational view of the axle pivot points for the suspension arms prevents the rotation of the axle housing 10 with respect to the arms 18 and 20 whereby acceleration and brake torque is transferred to the vehicle body. The spacing in the plan view of the attachment points of the suspension arm to the axle housing (FIG. 5) provides lateral stability to the suspension system when the vehicle is executing a cornering maneuver.

ALTERNATE EMBODIMENT

Figure 6:
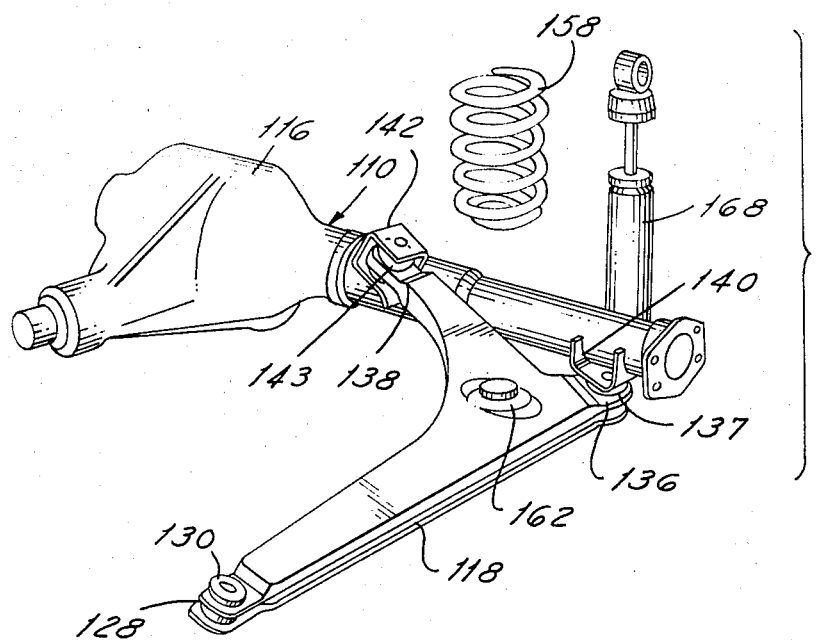
FIG. 6 is a perspective view of a portion of a suspension incorporating an alternate embodiment of the invention.

FIG. 6 discloses, in perspective, an alternate embodiment of the present invention which, in most respects, is functionally and structurally similar to the embodiment of FIGS. 1 to 5. In FIG. 6, the axle housing 110 rotatably supports a pair of driving wheels (not shown) and includes a differential housing 116. A stamped sheet metal suspension arm 118 has a generally triangular shape and includes a forward end 128 that is formed with an eye to contain a rubber bushing 130. The bushing 130 is attached to the vehicle chassis by a pivot bolt.

The outer end of the axle housing 110 is provided with a bracket 140 situated beneath the axle's centerline. The rear outer corner 136 of the suspension arm 118 has an eye in which a resilient rubber bushing 137 is fitted. The bushing 136 is connected to the bracket 140 by a pivot bolt.

An inboard bracket 142 is welded to the axle housing 110 to provide a support for the suspension arm 118 that is upwardly and forwardly of the axle centerline. The inner rear corner 138 of the left suspension arm 118 is provided with an eye in which a resilient bushing 143 is fitted. A pivot bolt passes through the eye 138 and the bushing 143 to connect the arm 118 to the bracket 142.

In the embodiment of FIG. 6, a coil spring 158 is interposed between a spring seat 162 formed on the arm 118 and a spring seat situated in the sheet metal of the vehicle chassis. A telescopic hydraulic shock absorber 168 is interposed between the axle housing bracket 140 and a chassis bracket (not shown).

The suspension of FIG. 6 operates in substantially the same fashion as the suspension of FIGS. 1 to 5. It is distinguishable from that suspension in that the coil springs are interposed between the suspension arms and the chassis rather than between the axle housing and the chassis. The construction of the suspension arms and the configuration of the bushing is also distinctive.

In the first illustrated embodiment of the invention, the pivot axes of the bushings connecting arm 18 or arm 20 to the frame and axle housing are generally parallel to the plane of the arm. In consideration of the fact that axes A and B are inclined with respect to each other, the resiliency of the bushings provides the compliance necessary to accommodate relative movement between the suspension components. In the embodiment of FIG. 6, the pivot bolts which connect the arm 118 to the axle housing and frame extend perpendicularly to the plane of the arm 118. Resiliency of the bushings 130, 137 and 143 provide the necessary compliance to accommodate relative movement of the suspension members.

The embodiment of the invention illustrated in FIG. 6 is particularly characterized by its simplicity of construction and economy of manufacture.

The foregoing description presents the presently preferred embodiments of this invention. Modification and alterations may occur to those skilled in the art that will come within the scope and spirit of the following claims:

I claim:

1. A motor vehicle suspension system having a chassis frame,
    a rigid axle housing,
    a road wheel positioned at each of the outer ends of said axle housing,
    driving means connected to said road wheels and constructed to transmit driving torque from a power source to said wheels,
    suspension means providing an articulated connection between said axle housing and said chassis frame, said suspension means comprising symmetrically arranged left and right suspension arms,
said left and right suspension arms constituting the sole means defining the jounce and rebound path of said axle housing with respect to said chassis frame,
left and right first resilient pivot means connecting the forward ends of said left and right suspension arms to said chassis frame,
left and right sets of second and third resilient pivot means connecting the rearward ends of said left and right suspension arms to said axle housing,
said second and third resilient pivot means of each of said left and right sets being vertically spaced apart in the side elevational view whereby said suspension arms may transfer torque reaction forces form said axle housing to said chassis frame during acceleration and braking of said road wheels,
said second and third resilient pivot means of each of said left and right sets being laterally spaced apart in the plan view to provide lateral stability between said axle housing and said chassis frame,
said second and third resilient pivot means of each of said left and right sets being longitudinally spaced apart,
left and right outer bracket means depending from said axle housing,
said second resilient pivot means of said left and right sets connecting said left and right suspension arms to said left and right outer bracket means,
left and right inner bracket means extending upwardly and forwardly from said axle housing,
said inner bracket means being disposed inwardly of said outer bracket means,
said third resilient pivot means of said left and right sets connecting said left and right suspension arms to said left and right inner bracket means,
left and right forward bracket means connected to said chassis frame,
said left and right first resilient pivot means being connected to said left and right forward bracket means,
said left and right first resilient pivot means being disposed laterally outwardly of said second and third resilient pivot means in the plan view,
left and right coil suspension springs operatively interposed between said axle housing and said chassis frame.

* * * * *